United States Patent [19]

Anderson

[11] Patent Number: 4,711,253

[45] Date of Patent: Dec. 8, 1987

[54] CHAFF BLOWER FOR COMBINES

[75] Inventor: Joseph A. Anderson, Jamestown, N. Dak.

[73] Assignee: Haybuster Manufacturing, Inc., Jamestown, N. Dak.

[21] Appl. No.: 864,713

[22] Filed: May 19, 1986

[51] Int. Cl.⁴ .................. A01F 12/48; A01F 29/12
[52] U.S. Cl. .................. 130/27 R; 130/27 HF; 56/13.3
[58] Field of Search .................. 56/14.6, 13.3, 12.8; 130/27 R, 27 HF, DIG. 5, DIG. 1

[56] References Cited

U.S. PATENT DOCUMENTS

| | | |
|---|---|---|
| 734,241 | 7/1903 | Ramsdell .................. 130/27 R |
| 1,695,532 | 12/1928 | Cady . |
| 3,014,485 | 12/1961 | Karlsson .................. 130/27 |
| 3,406,505 | 10/1968 | Hanson .................. 56/21 |
| 3,443,565 | 5/1969 | Jouveneaux .................. 130/27 |
| 3,638,659 | 2/1972 | Dahlquist et al. .................. 130/27 W |
| 3,860,010 | 1/1975 | Anderson et al. .................. 130/24 |
| 3,910,285 | 10/1975 | Sietmann .................. 130/24 |
| 4,051,856 | 10/1977 | Reed et al. .................. 130/27 HF |
| 4,236,530 | 12/1980 | Johnson .................. 130/27 R |
| 4,254,780 | 3/1981 | Powell et al. .................. 130/27 T |
| 4,426,826 | 1/1984 | Wesselmann .................. 56/13.3 |
| 4,465,081 | 8/1984 | Decoene et al. .................. 56/13.3 |
| 4,637,406 | 1/1987 | Guinn et al. .................. 130/27 HF |

Primary Examiner—Stephen J. Novosad
Assistant Examiner—Bruce M. Kisliuk
Attorney, Agent, or Firm—Kinney & Lange

[57] ABSTRACT

A blower centered on the axis of a combine immediately to the rear of the seive that carries the majority of the chaff for discharge onto the ground has a bilateral air nozzle that directs high velocity air perpendicular to the axis of the combine to cause the chaff to be spread across a substantial width distance at the rear of the combine. The spreading reduces concentration of such chaff in a narrow path and spreads it fairly evenly on the ground. The spreading reduces or eliminates problems encountered in minimal till or no-till planting that can be caused by having a deep layer of chaff that is toxic to successive crops that are planted without tillage. Any volunteer plants emerging from a chaff row cause competition for the planted crop and reduces yields.

10 Claims, 4 Drawing Figures

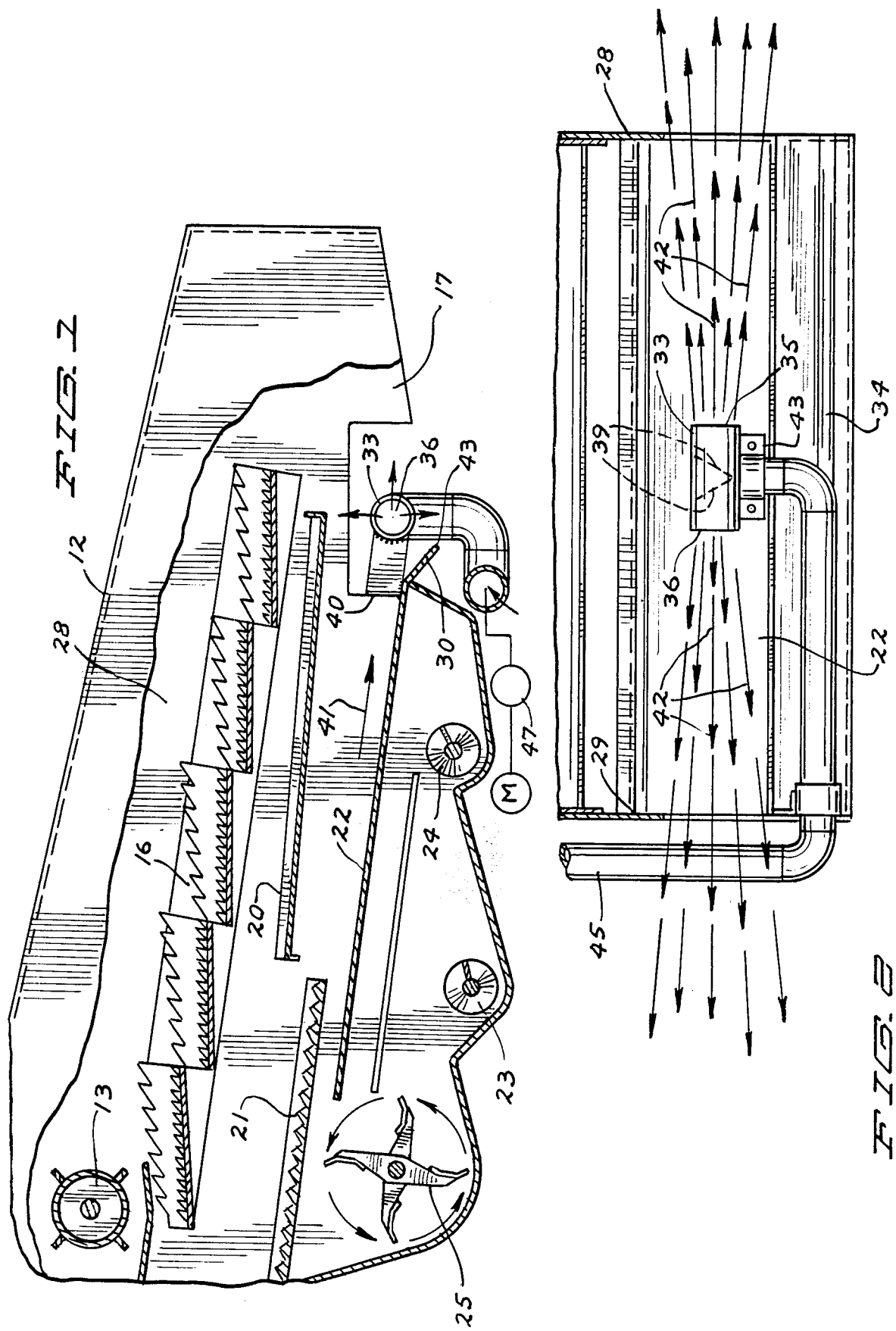

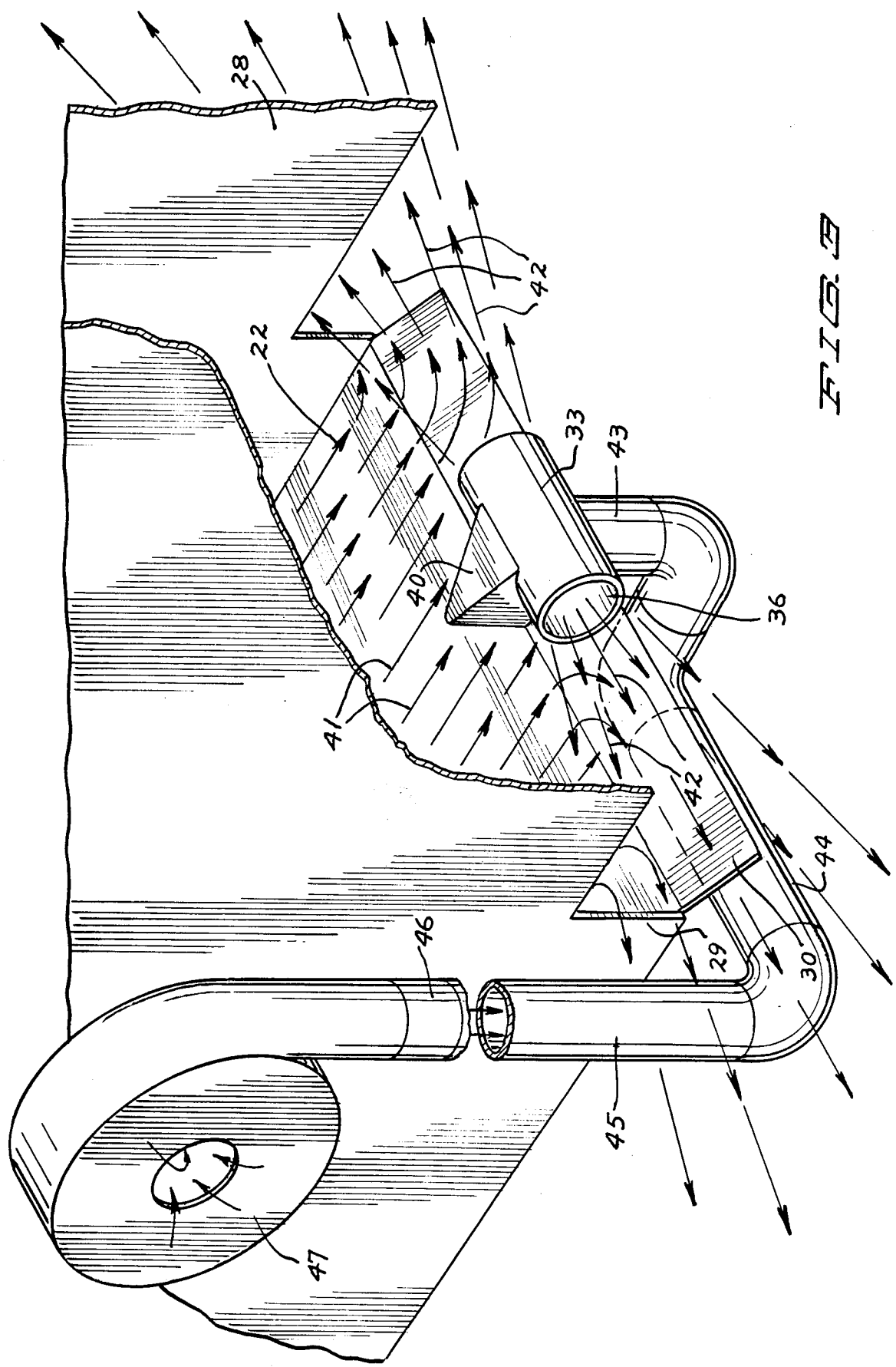

CHAFF BLOWER FOR COMBINES

BACKGROUND OF THE INVENTION

1. Field of the Invention.

The present invention relates to an attachment for grain combines that will permit spreading chaff across a substantial width of ground, preferably equaling the width of the cut material which is being threshed by the combine.

2. Description of the Prior Art.

Various blower apparatus has been used in the prior art for directing grain and chaff during separating the grain from the chaff and also for blowing straw. It has been proposed to blow chaff from one side of the combine laterally across the combine and out of the combine for spreading it. This still provides some difficulties because an air blast all of the way across the chaffer seive of the combine interferes with a good discharge of the chaff and does not give adequate spreading ability. U.S. Pat. No. 3,014,485 shows a combine that uses a cyclone type grain cleaning and separating mechanism. Air is used in such cyclones for discharging material. On this patent suction fan 35 discharges materials out through a spout 43, while the clean grain drops down into an auger 37 shown in the drawings of this patent. It does not show directing chaff in two directions, but merely directing it out through one spout 43.

A grain loss monitor that mounts to the back of a chaffer for monitoring grain is shown in U.S. Pat. No. 3,638,659, but it is for checking how much grain is being lost out the back end of the combine. It does not have any air blower to distribute chaff.

Fans for distributing material out of a pair of spouts are shown in U.S. Pat. No. 3,443,565, but this is not for mounting at the back of a combine.

Blowers that blow air along a chaffer in hillside combines to adequately distribute material on the chaffer surface itself is shown in U. S. Pat. No. 3,910,285, but this is interior of the combine and provides for distribution of material across the surface of the chaffer seive, while the seive is operating.

U.S. Pat. No. 3,406,505 shows a combine that relies in large part upon air for moving materials through the combine, including discharging materials. U.S. Pat. No. 4,254,780 shows an axial flow combine where diverters are used for diverting material, such as a baffle 65 that deflects material laterally from the rotor of the combine.

U.S. Pat. No. 4,236,530 shows a combine that uses a fan for moving materials and also for discharging materials rearwardly, but does not show laterally directed centrally located nozzles for spreading chaff from a regular combine.

U.S. Pat. No. 1,695,532 shows a chaffer for a stationary thresher using diverter plates and the like. U.S. Pat. No. 3,860,010 shows an auger for conveying chaff from a chaffer sieve onto the top of a thick stray window which will later be baled. This device works where the straw is to be baled, but many persons now leave the straw in the field.

SUMMARY OF THE INVENTION

The present invention relates to a chaff blower for dispersing chaff from the rear of a combine laterally outwardly in both directions from substantially the axial centerline of the combine to spread the chaff into a layer that will not adversely affect subsequent crops even when the land is farmed using no-till practices to the extent possible.

The device of the present invention comprises a blower that discharges through a double-ended nozzle in two directions right at the rear of the chaffer sieve to discharge and blow the chaff laterally from the combine housing to a width substantially equalling the cut of material that would normally be cut by the header of the combine or where swathers are used, the with of the swather cut. In other words, in many instances, the width of the standing grain being combined will be in the range of perhaps 20 feet, while the combine housing will only be six feet or so. There is thus a concentration of chaff coming off the chaffer seive in the six-foot width. The concentration can permit a substantial depth of chaff on the ground surface in some cases 8 to 10 inches deep. This can reduce stands of subsequently planted materials, particularly when no-till practices are followed.

A modified form of the device shows a cross trough mounted below the rear of the combine sieves, and supported in a suitable manner. In addition to prevent excessive chaff and straw from being discharged straight rearwardly, a canvas flap is supported on the hood of the combine and extends down to the rear side of the trough, and aids in controlling the amount of chaff and straw that is deposited directly rearward of the combine. The canvas flap can be weighted to control the amount of force or material necessary to move the flap out of the way to let the material discharge to rear if desired. The flap can be held in other suitable ways.

A kit is provided for attachment of the device of the present invention to existing combines, including a conduit, a blower that can be driven from any suitable motor or even an existing shaft on a combine and a nozzle that mounts in the center portions of the combine and directs air in two directions from the centerline of the combine. A smooth divider is used for dividing the chaff as it flows toward the blower. Also, the nozzle includes a flow divider or diverter.

BRIEF DESCRIPTION OF THE DRAWINGS

FIG. 1 is a schematic side sectional view of a typical combine showing an attachment made according to the present invention installed thereon;

FIG. 2 is an end view of FIG. 1 looking forwardly from the rear of the combine;

FIG. 3 is a schematic perspective representation of the attachment of the present invention.

DETAILED DESCRIPTION OF THE PREFERRED EMBODIMENTS

Figure 4:
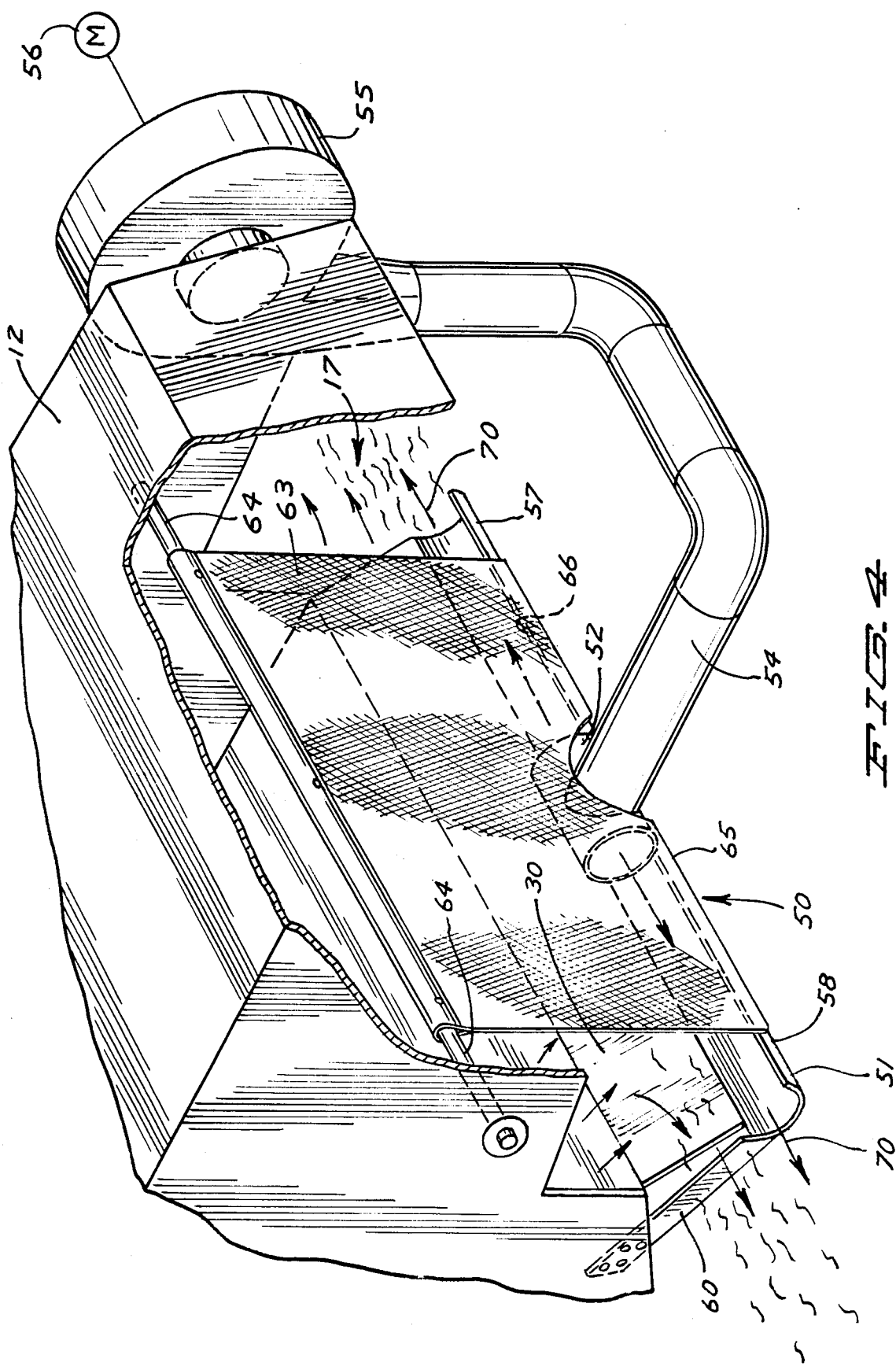
FIG. 4 is a fragmentary perspective schematic view of a modified form of the present invention.

A combine body indicated generally at 10 includes a frame and housing 12 made in a conventional manner. Schematically shown is a threshing cylinder 13 at the forward end of the machine.

Straw walkers 16 are used for separating the straw that will be discharged out through a straw discharge opening 17 at the rear of the combine, and a grain pan 20 is provided for returning grain to a primary seive 21. A chaffer seive 22 is located to the rear of the primary seive 21, and suitable return augers indicated at 23 and 24, respectively, are provided for returning grain. A seive blower fan 25 is also provided in a normal manner for separating the grain from the chaff. The chaff then comes out to the rear of the chaffer seive 22 and normally would be dropped directly on the ground through the bottom opening of the housing 12.

However, as perhaps seen schematically in FIG. 3, the chaffer seive 22 which extends between the side walls 28 and 29 of the combine housing has a rear deflector plate 30, and, immediately to the rear of the chaffer seive and above plate 30, there is a nozzle 33 mounted in a suitable manner, for example, using a cross brace 34 shown in FIGS. 1 and 2. This nozzle 33 has laterally extending open ends shown at 35 and 36, respectively.

A wedge-like divider 40 is provided for guiding material on the chaffer seive 22 normally in the direction indicated as 41 to divide the materials to move past the nozzle and make the materials flow past the nozzle openings 35 and 36.

Air under relatively high velocity is discharged out through the lateral openings 35 and 36 to blow the chaff which comes off the chaffer seive laterally, generally is indicated by the arrows 42 in FIG. 3.

Air is supplied through a conduit 43 and through the nozzle 33. Suitable fittings connect the conduit 43 to a horizontal section 44 extending laterally to one side of the combine. Additional sections 45 the flow of conduit lead to the outlet connection 46 of a blower 47 of a normal centrifugal type blower.

As can be seen, the chaff moving rearwardly on the chaffer seive is divided by the divider member 40 and the chaff then encounters the air blast from the nozzles 35 and 36, which air is directed perpendicular to the longitudinal axis of the combine. The combine longitudinal axis lies in the same direction as the arrow 41. As can be seen in FIG. 2, the nozzle 33 is centered between the side walls 28 and 24 of the combine.

As shown in FIG. 2, a flow divider 39 is mounted in the nozzle 33 and diverts and divides the vertical flow from conduct section 43 to smooth the flow to cause it to move smoothly laterally out openings 35 and 36.

The materials coming off the chaffer sieve are blown under air pressure from the fan 25 in the combine and are being blown rearwardly toward the outlet opening under the hood 17. Then, the material encounters the high velocity laterally directed air blasts from the center of the machine outwardly in both directions, and the chaff is spread across a substantial distance. The amount of spreading of the chaff can be controlled by the velocity of the air, the size of the nozzles and also, to a certain extent, the shape of the nozzles. However, it has been found that having an round tube shown at 33 with round outlet openings has been satisfactory for directing the chaff laterally sufficiently to spread it so that it will not interfere substantially with operation of subsequent tilling and seeding. Further, it will not be concentrated sufficiently to affect the stand of grain from subsequently seeded crops. The side walls of the combine can be recessed upwardly so they do not interfere with the spreading action.

In FIG. 4 a slightly modified form of the invention is shown, schematically, and in this form of the invention a combine rear housing 12 has a discharge opening 17 as in the first form of the invention, and the usual seives are provided as shown in FIG. 1.

In this form of the invention, a modified chaff blower indicated generally at 50 is provided, and comprises a generally U shaped trough assembly 51 that extends across the width of the combine and is connected to a nozzle indicated at 52 which is similar to the nozzle 33. Nozzle 52 is open at both ends to discharge air from a conduit 54 leading from a suitable fan 55 similar to the fan 25. The fan 55 can be driven in any suitable manner such as with belts, or a hydraulic motor indicated generally at 56.

The conduit 54 will carry air or fluid under pressure to the nozzle 52. The trough 51 is made up of two sections, comprising sections 57 and 58, extending from opposite ends of the nozzle in opposite lateral directions. As shown, the leading edge of the trough 51 is immediately below the discharge plate 30, but of course the discharge plate 30 can be removed if desired and the trough can be positioned directly below the existing seives of combines.

A suitable bracket 60 can be provided at each end of the trough 51 and supported back to the combine housing 12, or other suitable supports can be utilized.

A canvas curtain 63 is supported on a suitable cross member 64, so that the lower portion 65 thereof rests against the rear edge of the trough sections 57 and 58. The canvas curtain 63 is recessed to pass over the conduit 54, as shown. The canvas can have suitable weights at its lower end, for example those shown at dotted lines at 66, to provide a sufficient retarding action to retard the discharge of chaff directly to the rear, and to insure that most of the chaff will be distributed through the trough. As shown by the arrows 70, the air will travel along the trough and discharge the chaff and other material deposited in the trough laterally in a sort of tunnel effect or guided effect to obtain a different discharge pattern. By having the canvas 63 suspended in place, additional control on the amount of material being discharged directly rearwardly is obtained.

The kit that is used comprises a blower, conduits and the nozzle that laterally directs materials, together with means for mounting the nozzle in the center of the combine generally along the longitudinal central axis. The kit also may include a divider 40 for guiding chaff to the ends of the laterally directed nozzle openings. The divider 40 directs the chaff out to the outer ends of the nozzle in the first form of the invention so that the chaff material is intercepted by the air coming out from the nozzle openings 35 and 36 and directed laterally with sufficient force to spread the material acros a substantial width. The width of spread preferably approximates the width of the standing grain that it being processed by the combine. Normally, this would be the header width of a combine or a swather that was used for making a windrow of grain prior to combining. The nozzle is supported below the edges of the side walls of the combine to insure there is no interference by the side walls of the rear hood 17.

The kit including the trough 51 provides additional channeling of the material, because of the guiding effect of the trough's walls and the guide canvas that is used.

The kit is low cost and easily installed on existing units and effectively reduces the concentration of chaff to assure that subsequently planted crops are not adversely affected by the chaff.

Although the present invention has been described with reference to preferred embodiments, workers skilled in the art will recognize that changes may be made in form and detail without departing from the spirit and scope of the invention.

What is claimed is:

1. In a combine having means for separating grain, including a chaffer seive extending in fore and aft directions which discharges chaff outwardly at the rear end of the combine, the improvement comprising:

means for spreading the chaff laterally of the width of the chaffer seive comprising a nozzle member;

means to mount said nozzle member substantially centered on the central longitudinal center line of said combine, said nozzle member having openings facing in opposite directions and forming an air path that is on a nozzle member center line generally perpendicular to the longitudinal axis of the combine; and air supply means to provide a high pressure flow of air from said nozzle along the nozzle member center line in opposite directions laterally from the longitudinal centerline of said combine to cause spreading of chaff coming off the chaffer seive laterally from said longitudinal centerline.

2. The apparatus as specified in claim 1 and guide means to guide material coming from said chaffer seive laterally outwardly to the ends of said nozzle member to provide a smooth flow of chaff material past said nozzle member and into the laterally directed air flow.

3. The apparatus as specified in claim 1 wherein said nozzle comprises a cylindrical tube having a central axis, said tube having open ends and the central axis being positioned perpendicular to the longitudinal center line of the combine.

4. The apparatus as specified in claim 3, and trough means connected to the open ends of said cylindrical tube, extending laterally from said tube, said trough means being upwardly open to receive chaff from said seives.

5. The apparatus as specified in claim 4, wherein the trough means has front and rear edges and a canvas curtain suspended with respect to said trough means and extending upwardly therefrom, said canvas curtain being supported on a combine on which the means for spreading chaff is mounted, and having a lower edge positioned rearwardly of and resting against the rear edge of the trough means when the combine on which it is attached is not in use.

6. The apparatus as specified in claim 3 and conduit means connected to said nozzle, said conduit means leading to a location remote from said nozzle, and a high pressure blower connected to said conduit means to provide the air flow to said nozzle.

7. A kit for attachment to a combine having a chaffer seive over which chaff is discharged within the confines of space defined by the side walls of the combine, said kit including:

a nozzle member, said nozzle member having a central axis and outlets at both ends thereof generally normal to the axis;

a conduit connected to said nozzle between the ends thereof to provide an air flow that will be discharged out both ends of said nozzle along the central axis of the nozzle;

means to mount said nozzle with the central axis of the nozzle generally perpendicular to the longitudinal axis of a combine on which the kit is mounted and generally centered between the side walls thereof; and a blower having an outlet for connection to said conduit means to provide a supply of high pressure air to said nozzle through said conduit means.

8. The kit of claim 7 wherein said means for mounting comprises in part trough members extending laterally from both ends of said nozzle, respectively, and extending to substantially the side walls of a combine on which the kit is attached.

9. The kit of claim 7 and a canvas curtain adapted to be supported on a combine at the rear portions thereof and extending downwardly to a position immediately rearwardly of the trough members when the kit is installed on a combine.

10. The kit of claim 7 wherein said means for mounting comprises in part a divider member positioned ahead of the nozzle for dividing material moving rearwardly through a combine on which the kit is attached.

* * * * *